United States Patent
Yamazaki (10) Patent No.: US 11,675,116 B2
(45) Date of Patent: Jun. 13, 2023

(54) NEAR-INFRARED CUT-OFF FILTER AND IMAGING DEVICE INCLUDING THE SAME

(71) Applicant: HOYA CORPORATION, Tokyo (JP)

(72) Inventor: Takeshi Yamazaki, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 251 days.

(21) Appl. No.: 17/109,415

(22) Filed: Dec. 2, 2020

(65) Prior Publication Data

US 2021/0165145 A1 Jun. 3, 2021

(30) Foreign Application Priority Data

Dec. 3, 2019 (JP) ............................ JP2019-219165

(51) Int. Cl.
*G02B 5/20* (2006.01)
*G02B 5/28* (2006.01)

(52) U.S. Cl.
CPC ............. *G02B 5/208* (2013.01); *G02B 5/282* (2013.01)

(58) Field of Classification Search
CPC .......... G02B 5/208; G02B 5/282; G02B 5/22; G02B 5/223; G02B 5/226; G02B 5/20; G02B 1/11; G02B 1/113; G02B 1/115; G03B 11/00; H04N 23/55
See application file for complete search history.

(56) References Cited

U.S. PATENT DOCUMENTS

| 2004/0082460 A1* | 4/2004 | Yamane ................. G02B 5/226 501/48 |
| 2017/0017023 A1* | 1/2017 | Sugiyama ......... H01L 27/14618 |
| 2019/0116300 A1* | 4/2019 | Okuno ................. H04N 5/2254 |

FOREIGN PATENT DOCUMENTS

JP          6119920 B2     4/2017

* cited by examiner

*Primary Examiner* — Stephone B Allen
*Assistant Examiner* — Adam W Booher
(74) *Attorney, Agent, or Firm* — Rabin & Berdo, P.C.

(57) ABSTRACT

Provided is a near-infrared cut-off filter having excellent oblique incidence characteristics due to extremely low dependence on the angle of incidence, and a low transmittance in a wavelength region of 1000 nm or more. More particularly, the near-infrared cut-off filter includes a transparent substrate that is formed of glass containing iron atoms and has a half-value wavelength of greater than 630 nm on a long wavelength side of a transmittance curve and an average transmittance of 1% or less in a wavelength region of 1000 to 1200 nm; and a resin layer formed on at least one main surface of the transparent substrate to absorb light of a specific wavelength.

18 Claims, 7 Drawing Sheets

NEAR-INFRARED CUT-OFF FILTER AND IMAGING DEVICE INCLUDING THE SAME

CROSS-REFERENCE TO RELATED APPLICATION

This application claims priority to and the benefit of Japanese Patent Application No. 2019-219165, filed on Dec. 3, 2019, the disclosure of which is incorporated herein by reference in its entirety.

BACKGROUND

Field of the Invention

The present disclosure relates to a near-infrared cut-off filter disposed on a front surface of a solid-state imaging device to correct the visibility of the solid-state imaging device and an imaging device including the near-infrared cut-off filter.

Discussion of Related Art

In recent years, imaging devices provided with a solid-state imaging device such as CCD or CMOS sensors are used in digital cameras, portable information terminals, etc. Among such imaging devices, a solid-state imaging device has spectral sensitivity ranging from near-ultraviolet to near-infrared, thus being provided with a near-infrared cut-off filter that is configured to block the near-infrared portion to correct to be close to the human visibility. Such a near-infrared cut-off filter is disposed on an optical path of a solid-state imaging device. To reduce the overall size of an imaging device, configurations such as a near-infrared cut-off filter provided with a cover glass are practically used in imaging devices (e.g., Patent Document 1).

Figure 11:
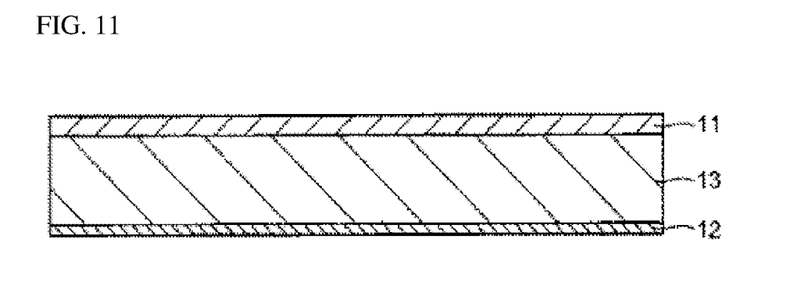
FIG. 11 is a longitudinal sectional view illustrating the configuration of an existing near-infrared cut-off filter.

FIG. 11 illustrates an embodiment of the configuration of a near-infrared cut-off filter (conventional example) disclosed in Patent Document 1. As shown in FIG. 11, the near-infrared cut-off filter disclosed in Patent Document 1 includes a transparent substrate 13; an absorption layer 11 formed on one main surface of the transparent substrate 13 and configured to absorb light in the near-infrared wavelength region and the ultraviolet wavelength region; and a reflective layer 12 formed on another main surface of the transparent substrate 13 and configured to control the transmission and shielding of light in a specific wavelength range. The reflective layer 12 is composed of a multilayer dielectric film with a thickness of 2 to 10 μm formed by alternately laminating a dielectric film (low dielectric film) with a low refractive index and a dielectric film (high dielectric film) with a high refractive index. Since the reflective layer 12 is configured such that the spectral transmittance thereof satisfies a predetermined requirement, the reflective layer 12 has a spectral characteristic close to the non-visibility curve, in particular, on the long wavelength side, and can be used to realize a near-infrared cut-off filter that is less dependent on the angle of incidence.

RELATED ART DOCUMENT

Patent Document

Japanese Patent No. 6119920

SUMMARY OF THE INVENTION

Problems to be Solved by the Invention

However, since a near-infrared cut-off filter disclosed in Patent Document 1 includes a reflective layer 12 composed of a relatively thick (thickness: 2 to 10 μm) multilayer dielectric film, the length of an optical path increases when light is obliquely incident on the reflective layer 12, resulting in occurrence of phase shift.

Figure 12:
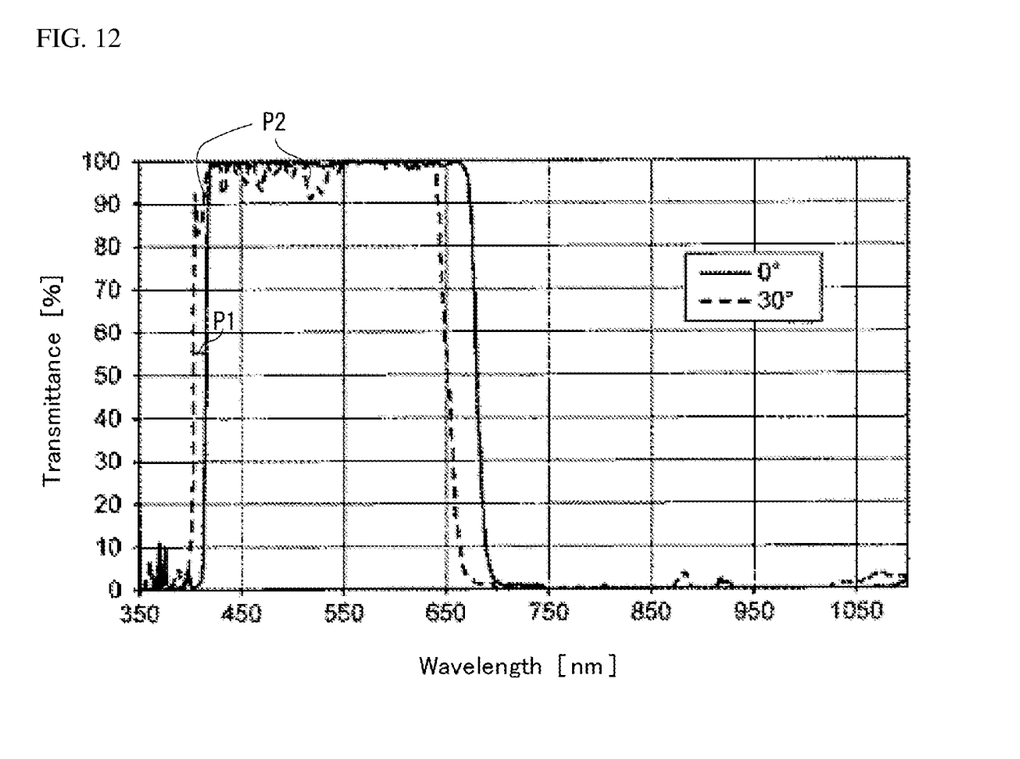
FIG. 12 illustrates a spectral transmittance curve of a reflective layer used in an existing near-infrared cut-off filter.
Figure 13:
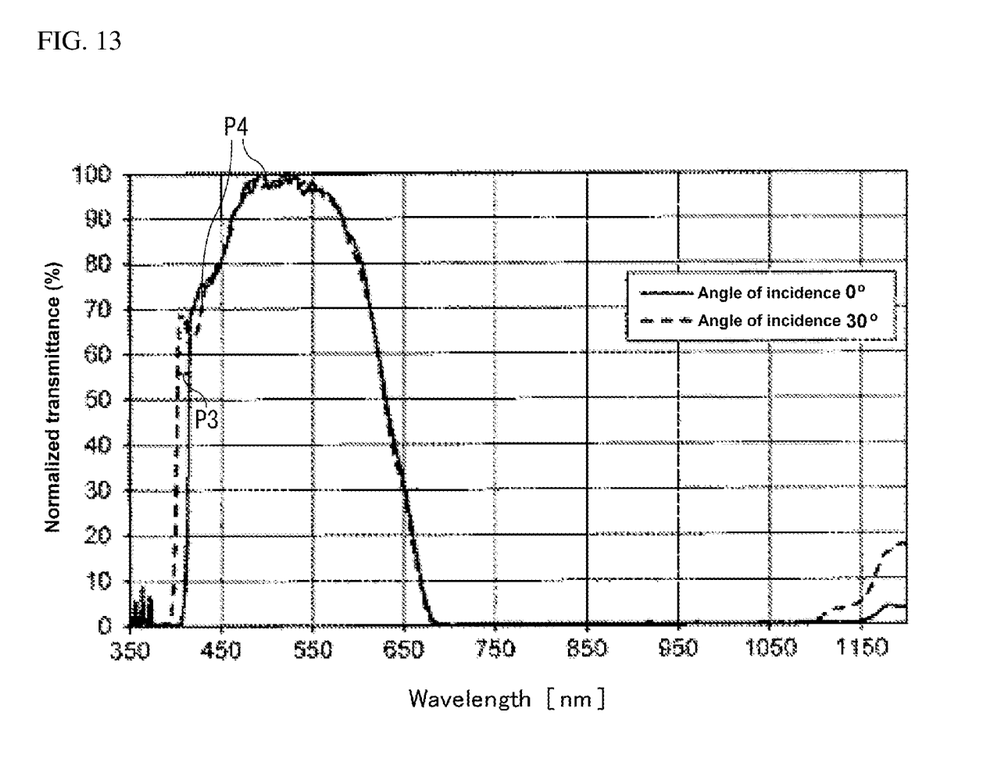
FIG. 13 illustrates a spectral transmittance curve of an existing near-infrared cut-off filter.

FIG. 12 illustrates a spectral transmittance curve of a reflective layer 12 of a near-infrared cut-off filter of FIG. 11. Particularly, FIG. 12 illustrates a spectral transmittance curve (solid line) when the angle of incidence is 0°, and a spectral transmittance curve (dashed line) when the angle of incidence is 30°. In addition, FIG. 13 illustrates a spectral transmission curve of the near-infrared cut-off filter of FIG. 11. Particularly, FIG. 13 illustrates a spectral transmittance curve (solid line) when the angle of incidence is 0°, and a spectral transmittance curve (dashed line) when the angle of incidence is 30°.

As shown in FIG. 12, a spectral transmittance curve shifts to a short wavelength side (part P1 in FIG. 12) or ripples occur in the spectral transmittance curve (part P2 in FIG. 12), due to the influence of phase shift when light is incident on the reflective layer 12 at an incidence angle of 30°. In addition, when wavelength shift occurs in a spectral transmittance curve of the reflective layer 12, wavelength shift occurs also in a spectral transmittance curve of a near-infrared cut-off filter (part P3 in FIG. 13), so that the color reproduction of a solid-state imaging device may be decreased. In addition, when ripples occur in a spectral transmittance curve of the reflective layer 12, ripples occur also in a spectral transmittance curve of the near-infrared cut-off filter (part P4 in FIG. 13), so that a kind of ghost may be observed on a solid-state imaging device. Accordingly, there has been a need for a near-infrared cut-off filter that does not cause wavelength shift or ripple even by oblique incident light and thus has excellent oblique incidence characteristics.

In addition, the near-infrared cut-off filter disclosed in Patent Document 1 exhibits transmittance increase in a wavelength region of 1000 nm or more as shown in FIG. 13, which differs from human visibility. Accordingly, there is a problem that color reproduction of a solid-state imaging device is decreased. For this reason, there has been a need for a near-infrared cut-off filter capable of maintaining a low transmittance even in a wavelength region of 1000 nm or more.

Therefore, the present disclosure has been made in view of the above problems, and it is one object of the present disclosure to provide a near-infrared cut-off filter that has excellent oblique incidence characteristics due to extremely low dependence on the angle of incidence, and a low transmittance in a wavelength region of 1000 nm or more; and an imaging device provided with the near-infrared cut-off filter.

Means for Solving the Problems

The present inventors have intensively studied to accomplish the above objects, and, as a result, have confirmed that glass including iron atoms (Fe) can be used as a transparent substrate that is capable of transmitting visible light and has a low average transmittance in a wavelength region of 1000 nm or more. Accordingly, a cut-off filter capable of selectively transmitting light in the visible region, even without use of a reflective film used in existing near-infrared cut-off filters, has been manufactured. The present disclosure is based on this finding.

That is, a near-infrared cut-off filter according to the present disclosure includes a transparent substrate that is formed of glass containing iron atoms and has a half-value wavelength of greater than 630 nm on a long wavelength side of a transmittance curve and an average transmittance of 1% or less in a wavelength region of 1000 to 1200 nm; and a resin layer formed on at least one main surface of the transparent substrate to absorb light of a specific wavelength.

Since a conventional reflective layer composed of a multilayer dielectric film is unnecessary (i.e., since a reflective layer is excluded) in accordance with the configuration, a change in the length of an optical path hardly occurs even when light is obliquely incident on a near-infrared cut-off filter, so that occurrence of phase shift is suppressed. Accordingly, wavelength shift or ripples hardly occur in a spectral transmittance curve of the near-infrared cut-off filter according to the present disclosure. In addition, the near-infrared cut-off filter has a low transmittance in a wavelength region of 1000 nm or more, thus being close to human visibility.

In addition, a half-value wavelength on a short wavelength side of a transmittance curve of the transparent substrate is preferably 300 to 420 nm, and a half-value wavelength on a long wavelength side thereof is preferably 630 to 750 nm.

In addition, the resin layer may include a transparent resin; and a dye uniformly dispersed in the transparent resin. Here, the dye preferably includes an ultraviolet absorbing dye having a maximum absorption wavelength of 350 to 400 nm; and a first near-infrared absorbing dye having a maximum absorption wavelength of 650 to 750 nm. In addition, the dye preferably, further includes a second near-infrared absorbing dye having a maximum absorption wavelength of 750 to 950 nm.

In addition, the resin layer may include one or more selected from Ti atom, Zr atom and Al atom, together with Si atom.

In addition, a bonding layer may be provided between the transparent substrate and the resin layer so as to improve adhesion between the transparent substrate and the resin layer. Here, the bonding layer preferably has a single-layer structure including one or more selected from Ti atom, Zr atom and Al atom, together with Si atom. In addition, in the bonding layer, a ratio of the total number of atoms of Ti atom, Zr atom and Al atom to the total number of atoms of Si atom, Ti atom, Zr atom and Al atom is preferably greater than 0 atomic % and 33.3 atomic % or less.

In addition, a first antireflection film may be formed on the resin layer, and a second antireflection film may be formed on another main surface of the transparent substrate. Here, the near-infrared cut-off filter preferably has a half-value wavelength of 385 to 420 nm on a short wavelength side of a transmittance curve, and a half-value wavelength of 600 to 680 nm on a long wavelength side thereof. In addition, each of the first and second antireflection films is preferably formed of a multilayer dielectric film having a thickness of 500 nm or less. In addition, the number of layers constituting the multilayer dielectric film is preferably 10 or less.

In addition, the multilayer dielectric film is preferably formed by alternately laminating a low-refractivity-index dielectric film formed of a material having a refractive index of 1.1 to 1.5, and a high-refractive-index dielectric film formed of a material having a refractive index of 2.0 to 2.5.

In addition, the multilayer dielectric film is preferably formed by alternately laminating a low-refractivity-index dielectric film formed of a material having a refractive index of 1.1 to 1.3, and a high-refractive-index dielectric film formed of a material having a refractive index of 1.4 to 1.6.

In addition, the transparent substrate has preferably a thickness of 0.01 to 1.5 mm.

In accordance with another aspect of the present disclosure, there is provided an imaging device including a solid-state imaging device; and the near-infrared cut-off filter of any one of the foregoings. Here, the near-infrared cut-off filter may be disposed immediately in the front of the solid-state imaging device to function as a cover glass.

Advantageous Effects of the Invention

As such, according to the present disclosure, a near-infrared cut-off filter having extremely low dependency on the angle of incidence, and hence excellent oblique incidence characteristics, as well as a low transmittance in a wavelength region of 1000 nm or more can be realized. In addition, an imaging device having excellent color reproduction due to inclusion of the near-infrared cut-off filter can be realized.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Description of Exemplary Embodiments

Hereinafter, embodiments of the present disclosure will be described in detail with reference to the accompanying drawings. In addition, the same or similar portions of the drawings are denoted by the same reference numerals, and the description thereof is not repeated.

First Embodiment

Figure 1A:
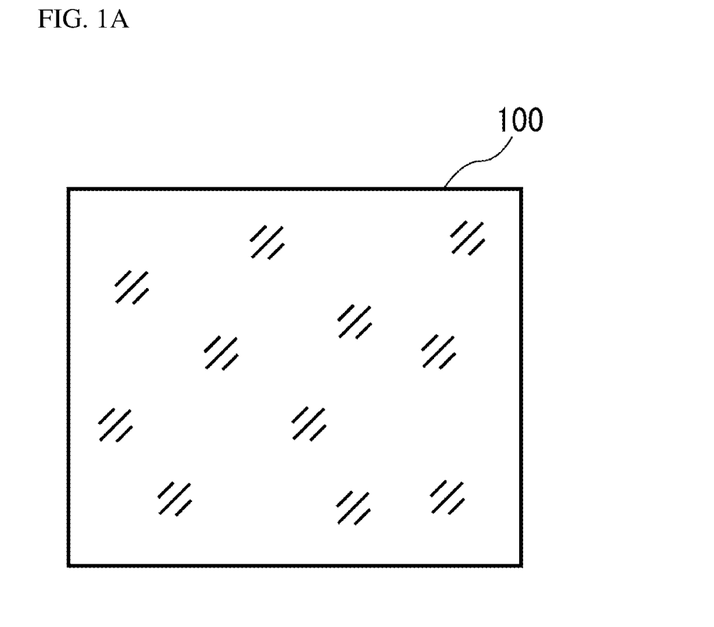
FIG. 1A and FIG. 1B illustrate the configuration of a near-infrared cut-off filter according to a first embodiment of the present disclosure.
Figure 1B:
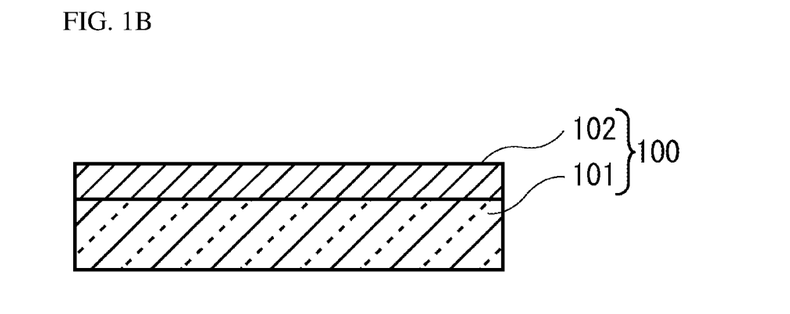
Figure 2:
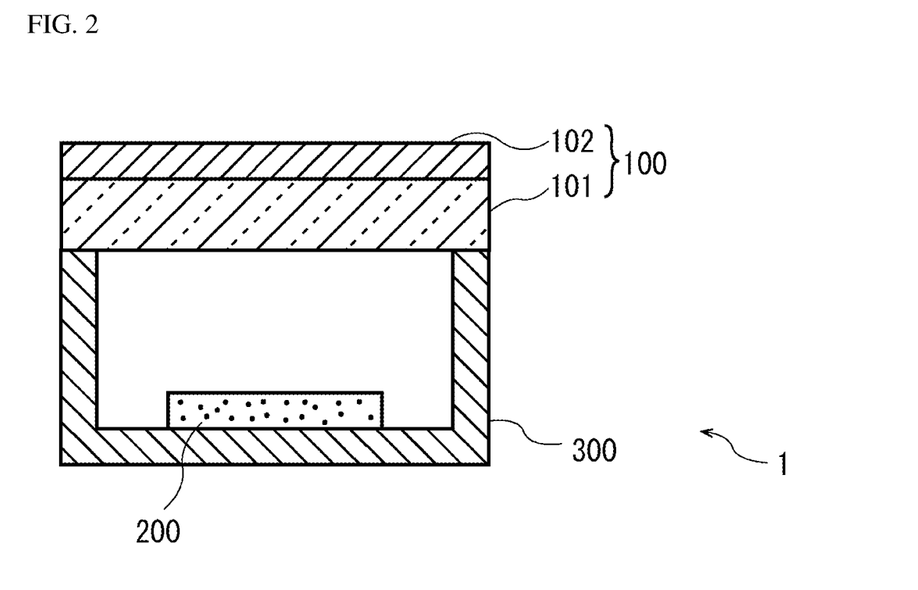
FIG. 2 is a longitudinal sectional view illustrating the configuration of an imaging device on which a near-infrared cut-off filter according to a first embodiment of the present disclosure is mounted.

FIG. 1 illustrates the configuration of the near-infrared cut-off filter 100 according to a first embodiment of the present disclosure. Particularly, FIG. 1A illustrates a plan view of the near-infrared cut-off filter 100, and FIG. 1B illustrates a longitudinal sectional view of the near-infrared cut-off filter 100. In addition, FIG. 2 is a longitudinal sectional view illustrating the configuration of an imaging device 1 wherein an opening of a package 300 of a solid-state imaging device 200 is sealed by the near-infrared cut-off filter 100 of the embodiment. As shown in FIGS. 1 and 2, the near-infrared cut-off filter 100 of the embodiment is attached to a front surface of the package 300 accommodating the solid-state imaging device 200 to correct the visibility of the solid-state imaging device 200 while protecting the solid-state imaging device 200.

As shown in FIG. 1, an appearance of the near-infrared cut-off filter 100 of the embodiment has a rectangular plate shape (e.g., 6 mm (horizontal direction)×5 mm (vertical direction)), and the near-infrared cut-off filter 100 includes a glass substrate 101 (a transparent substrate); and a resin layer 102 formed on one main surface (an upper surface of FIG. 1B) of the glass substrate 101.

[Glass Substrate]

The glass substrate 101 according to the present disclosure may be made of glass which contains iron atoms, a half-value wavelength on a long wavelength side of a transmittance curve of which exceeds 630 nm, and an average transmittance in a wavelength region of 1000 nm or higher of which is 1% or less. For example, any glass selected from among phosphate glass, fluorophosphate glass, silicate glass, borosilicate glass, and the like may be used. In addition, in the embodiment, an absorption glass substrate formed of phosphate glass containing an iron atom or fluorophosphate glass containing an iron atom is used as the glass substrate 101. The thickness of the glass substrate 101 of the embodiment is not specifically limited, but, from the viewpoint of miniaturization and weight reduction, the thickness of the glass substrate 101 is preferably 0.01 to 1.5 mm, more preferably 0.01 to 0.70 mm, even more preferably 0.01 to 0.30 mm.

The phosphate glass according to the embodiment contains P, O, and Fe as essential components, and other optional components. Other optional components of the phosphate glass may be, for example, Al, B, Si, Zn, Ca, Mg, Sr, Ba, Li, Na, K, Cs, and the like.

As a particular example, the phosphate glass preferably includes:

$P_2O_5$: greater than 0% by mass and 90% by mass or less,

FeO: greater than 0% by mass and 20% by mass or less, $Al_2O_3$: 0 to 40% by mass, BaO: 0 to 40% by mass, and $B_2O_3$: 0 to 40% by mass.

In addition, the phosphate glass more preferably includes:

$P_2O_5$: 40 to 80% by mass,

FeO: greater than 0% by mass and 20% by mass or less, $Al_2O_3$: greater than 0% by mass and 30% by mass or less, BaO: greater than 0% by mass and 20% by mass or less, and $B_2O_3$: greater than 0% by mass and 20% by mass or less.

In addition, the phosphate glass even more preferably includes:

$P_2O_5$: 40 to 80% by mass,

FeO: 1 to 10% by mass, $Al_2O_3$: 1 to 30% by mass,

BaO: 1 to 20% by mass, and

CuO: 1 to 20% by mass.

In addition, the fluorophosphate glass according to the embodiment includes P, O, F, and Fe as essential components, and other optional components. Other optional components of the fluorophosphate glass may be, for example, Al, B, Si, Zn, Ca, Mg, Sr, Ba, Li, Na, K, Cs, and the like.

In addition, the fluorophosphate glass preferably includes BaO. When BaO is contained in an amount of 0% or more, devitrification resistance and meltability of glass may be improved. When the content of BaO exceeds 10%, devitrification tends to easily occur. Accordingly, an appropriate content of BaO is 0 to 10%. In addition, a content of BaO is more preferably 1 to 10%, even more preferably 1 to 5%.

In addition, the fluorophosphate glass preferably includes $Al_2O_3$. When $Al_2O_3$ is contained in an amount of 0% or more, the stability and chemical durability of glass may be improved. When the content of $Al_2O_3$ exceeds 10%, devitrification tends to easily occur. Accordingly, an appropriate content of $Al_2O_3$ is 0 to 10%. In addition, a content of $Al_2O_3$ is more preferably 1 to 10%, even more preferably 1 to 5%.

In addition, the fluorophosphate glass preferably includes $Y_2O_3$. When $Y_2O_3$ is contained in an amount of 0% or more, a refractive index may be increased while maintaining thermal stability. When the content of $Y_2O_3$ exceeds 10%, devitrification tends to easily occur, and a glass transition temperature or a sag temperature elevates. Accordingly, an appropriate content of $Y_2O_3$ is 0 to 10%. In addition, a content of $Y_2O_3$ is more preferably 1 to 10%, even more preferably 1 to 5%.

In addition, the fluorophosphate glass preferably includes $BaCl_2$. An appropriate amount of Cl is introduced into glass due to $BaCl_2$, so that a difference between a crystallization initiation temperature (Tx) of the glass and a glass transition temperature (Tg) thereof increases, resulting in improved stability of the glass against devitrification. When the content of $BaCl_2$ exceeds 10%, devitrification tends to easily occur. Accordingly, an appropriate content of $BaCl_2$ is 0 to 10%. In addition, a content of $BaCl_2$ is more preferably 1 to 10%, even more preferably 1 to 5%.

In addition, the glass substrate 101 of the embodiment is configured to have an average transmittance of 1% or less in a wavelength region of 1000 to 1200 nm. Detailed description thereof is provided below. As such, upon use of the glass substrate 101 having a low average transmittance in a wavelength region of 1000 to 1200 nm, a cut-off filter capable of selectively transmitting light in the visible region may be manufactured even without application of a reflective film (multilayer dielectric film) used in existing near-infrared cut-off filters.

In addition, a half-value wavelength (UV_λ50) on a short wavelength side of a transmittance curve of the glass substrate 101 is preferably 300 to 420 nm, more preferably 310 to 380 nm, even more preferably 310 to 350 nm. In addition, a half-value wavelength (NIR_λ50) on a long wavelength side of a transmittance curve of the glass substrate 101 is greater than 630 nm, preferably 630 to 750 nm, more preferably 630 to 700 nm. In addition, in the present specification, a half-value wavelength refers to a wavelength when a transmittance is 50%, a half-value wavelength (UV_λ50) on a short wavelength side refers to a wavelength when a transmittance reaches 50% upon rising of a transmittance curve, and a half-value wavelength (NIR_λ50) on a long wavelength side refers to a wavelength when a transmittance reaches 50% upon descending of a transmittance curve.

[Resin Layer]

The resin layer 102 of the embodiment includes a dye absorbing light of a specific wavelength; and a resin. The resin layer 102 includes, for example, at least one of a near-infrared absorbing dye and an ultraviolet absorbing dye; and a transparent resin. Preferably, the dye is uniformly dissolved or dispersed in the transparent resin.

As the near-infrared absorbing dye constituting the resin layer 102, a conventionally known dye may be used. For example, one or more selected from a cyanine dye, a polymethine dye, a squarylium dye, a porphyrin dye, a metal dithiol complex dye, a phthalocyanine dye, a diimonium dye, and inorganic oxide particles may be used. One or more selected from a squarylium dye, a cyanine dye, and a phthalocyanine dye are more preferred.

As the ultraviolet absorbing dye constituting the resin layer 102, a conventionally known dye may be used. For example, one or more selected from a benzotriazole-based compound, a benzophenone-based compound, a triazine-based compound, a benzoxazinone-based compound, a cyanoacrylate-based compound, an oxanilide-based compound, a salicylate-based compound, a formamidine-based compound, an indole-based compound, and an azomethine-based compound may be used. One or more selected from a benzotriazole-based compound, a benzophenone-based compound, and a triazine-based compound are more preferred.

As the resin constituting the resin layer 102, a conventionally known transparent resin may be used. One or more selected from an acrylic resin, an epoxy resin, an ene-thiol resin, a polycarbonate resin, a polyether resin, a polyarylate resin, a polysulfone resin, a polyethersulfone resin, a poly (p-phenylene) resin, a polyarylene ether phosphine oxide resin, a polyimide resin, a polyamideimide resin, a polyolefin resin, a cyclic olefin resin and a polyester resin may be used. As the transparent resin, a resin having a high glass transition point (Tg) is preferred from the viewpoint of transparency, solubility of a near-infrared absorbing dye in the transparent resin, and heat resistance. Accordingly, a thermosetting resin is appropriate. In particular, one or more selected from a polyester resin, a polycarbonate resin, a polyethersulfone resin, a polyarylate resin, a polyimide resin, and an epoxy resin may be used. As the polyester resin, one or more selected from a polyethylene terephthalate resin and a polyethylene naphthalate resin are preferred. In addition, in the case of a thermoplastic resin, the thermoplastic resin may be appropriately used as a transparent resin by increasing heat resistance through adjustment of a functional group, etc. of the thermoplastic resin. For example, an acrylic resin, a polyamide-based resin, a polyolefin-based resin, and the like, heat resistance of which can be increased through adjustment of a functional group, etc., may be used as a transparent resin.

The resin layer 102 may include optional components such as a color correction dye, a leveling agent, an antistatic agent, a heat stabilizer, a light stabilizer, an antioxidant, a dispersant, a flame retardant, a lubricant, and a plasticizer, within a range not impairing the effects of the present disclosure, in addition to the near-infrared absorbing dye and the transparent resin.

The resin layer 102 may be formed, for example, by dissolving or dispersing a dye, a transparent resin, and optional components in a solvent to prepare a resin film formation liquid, coating with the resin film formation liquid and drying the same, and performing curing as needed. In addition, the resin film formation liquid may include a known cationic, anionic, or nonionic surfactant.

In addition, the resin film formation liquid may be coated using one or more selected from an immersion coating method, a cast coating method, a spray coating method, a spin coating method, and the like.

As such, the resin layer 102 is formed on the glass substrate 101 and is configured to absorb light of a specific wavelength. Light in a desired visible region may be extracted by setting an absorption wavelength (i.e., selecting an optimal dye) depending upon the spectral transmittance characteristics of the glass substrate 101. In particular, the resin layer 102 of the embodiment may include an ultraviolet absorbing dye with a maximum absorption wavelength of 350 to 400 nm, and a near-infrared absorbing dye (a first near-infrared absorbing dye) with a maximum absorption wavelength of 650 to 750 nm.

In addition, the resin layer 102 may further include a near-infrared absorbing dye (a second near-infrared absorbing dye) with a maximum absorption wavelength of 750 to 950 nm.

In addition, the resin layer 102 of the embodiment is formed on one main surface (an upper surface in FIG. 1B) of the glass substrate 101, but the present disclosure is not limited thereto. The resin layer 102 may be formed on another main surface (a lower surface in FIG. 1B) of the glass substrate 101 or may be formed on both surfaces of the glass substrate 101.

In addition, the resin layer 102 does not necessarily have to be one layer, and may be composed of multiple layers.

In addition, a half-value wavelength (UV_λ50) on a short wavelength side of a spectral transmittance curve of the near-infrared cut-off filter 100 including the resin layer 102 is 385 to 420 nm, a half-value wavelength (NIR_λ50) on a long wavelength side thereof is 590 to 650 nm, and an average transmittance of the near-infrared cut-off filter 100 in a wavelength region of 1000 nm or more is 1.0% or less, which is close to human visibility (detailed description thereof is provided below).

[Imaging Device]

Now, an imaging device according to the present disclosure is described. As shown in FIG. 2, the imaging device 1 according to the present disclosure includes the solid-state imaging device 200, the package 300 accommodating the solid-state imaging device 200, and the near-infrared cut-off filter 100 attached to a front surface of the package 300.

An example of the solid-state imaging device 200 includes an image sensor such as a charge-coupled device (CCD) or a complementary metal oxide semiconductor (CMOS).

The solid-state imaging device 200 is disposed on an approximately central portion of a bottom surface of the square package 300, and another main surface side (a lower side in FIG. 1B) of the near-infrared cut-off filter 100 is attached to an opening of the package 300 so as to face the solid-state imaging device 200. In addition, in FIG. 2 although a resin layer 102 side of the near-infrared cut-off filter 100 is illustrated as an incident surface on which light directed toward the solid-state image device 200 is incident, and another main surface of the near-infrared cut-off filter 100 is illustrated as an emission surface, the present disclosure is not limited to such a configuration. The near-infrared cut-off filter 100 may be attached in a vertically opposite direction (i.e., such that the resin layer 102 faces the solid-state imaging device 200).

In addition, the near-infrared cut-off filter 100 of the imaging device 1 of FIG. 2 is illustrated as being attached to an opening of the package 300 to form a so-called cover glass, but the present disclosure is not limited to such a configuration. For example, the imaging device 1 may include a lens group (not shown) serving to guide light to the solid-state imaging device 200. For example, the near-infrared cut-off filter 100 may be disposed on the side of the imaging device 1 rather than a lens group, and a cover glass may be disposed on the side of the imaging device 1 rather than the near-infrared cut-off filter 100.

Hereinafter, the near-infrared cut-off filter 100 of the embodiment is described in more detail with reference to examples and comparative examples, but the present disclosure is not limited to the examples.

Example 1

[1. Selection of Glass Substrate 101]

Figure 3:
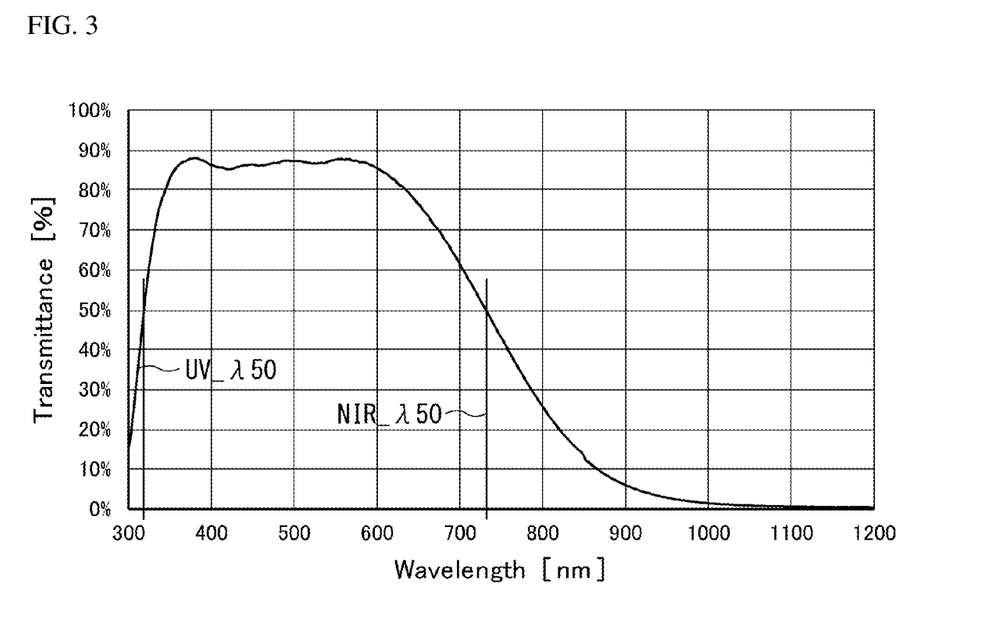
FIG. 3 illustrates a spectral transmittance curve of a glass substrate used in a near-infrared cut-off filter according to a first embodiment of the present disclosure.

As the glass substrate 101 of Example 1, phosphate glass (HAS, thickness: 0.9 mm) manufactured by HOYA Corporation was selected. FIG. 3 illustrates a spectral transmittance curve of the glass substrate 101 of Example 1. Here, the vertical axis represents transmittance (%), and the horizontal axis represents wavelength (nm). As shown in FIG. 3, the glass substrate 101 of the example exhibits an average transmittance of 0.7% (i.e., 1% or less) in a wavelength region of 1000 to 1200 nm.

In addition, for the glass substrate 101 of the example, a half-value wavelength (UV_$\lambda$50) on a short wavelength side of the transmittance curve is about 319 nm (i.e., in a range of 300 to 420 nm), and a half-value wavelength (NIR_$\lambda$50) on a long wavelength side thereof is about 731 nm (i.e., in a range of 630 to 750 nm).

[2. Formation of Resin Layer 102]

An acrylic resin (transparent resin), a benzotriazole compound (ultraviolet absorbing dye) and a squarylium compound (a first near-infrared absorbing dye) are mixed in a predetermined mixing ratio in a container to prepare a resin film formation liquid. The obtained resin film formation liquid was applied onto the glass substrate 101 using a spin coater. Then, the glass substrate 101 to which the resin film formation liquid had been applied was placed on a hot plate heated to 160° C., followed by heating for 20 minutes to be cured. As a result, the near-infrared cut-off filter 100 of the embodiment was manufactured.

Figure 4:
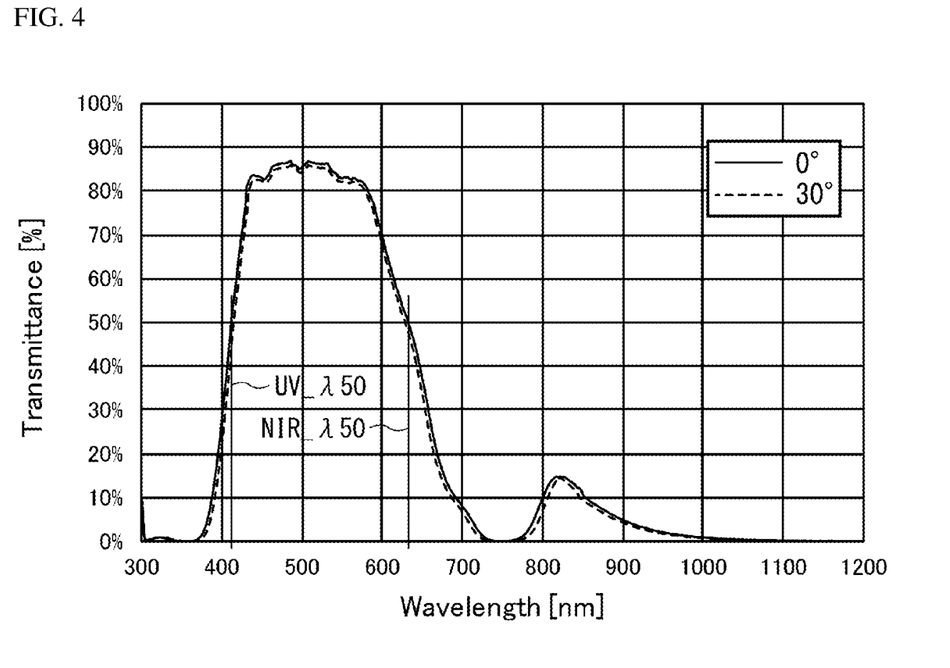
FIG. 4 illustrates a spectral transmittance curve of a near-infrared cut-off filter according to a first embodiment of the present disclosure.

FIG. 4 illustrates a spectral transmittance curve of the near-infrared cut-off filter 100 of Example 1. Particularly, FIG. 4 illustrates a spectral transmittance curve (solid line) when the angle of incidence is 0°, and a spectral transmittance curve (dashed line) when the angle of incidence is 30°. As shown in FIG. 4, in the case of the near-infrared cut-off filter 100 of the example, a half-value wavelength (UV_$\lambda$50) on a short wavelength side of the spectral transmittance curve is about 412 nm, a half-value wavelength (NIR_$\lambda$50) on a long wavelength side thereof is about 633 nm, and an average transmittance in a wavelength region of 1000 to 1200 nm is 0.5%. Therefore, the near-infrared cut-off filter exhibiting properties close to human visibility was obtained.

In addition, since the near-infrared cut-off filter 100 of the example does not include a reflective film included in an existing near-infrared cut-off filter, the occurrence of phase shift, wavelength shift, and ripples that significantly impair the performance of a cut-off filter, may be suppressed even when the angle of incidence is 30°.

Example 2

A near-infrared cut-off filter of Example 2 differs from the near-infrared cut-off filter of Example 1 in that the near-infrared cut-off filter of Example 2 further includes a near-infrared absorbing dye (a second near-infrared absorbing dye) having a maximum absorption wavelength of 750 to 950 nm added to the resin layer 102. A glass substrate 101 is the same as the glass substrate 101 of Example 1.

The resin layer 102 of Example 2 has a three-layer structure. Particularly, a first layer composed of an acrylic resin and a benzotriazole compound is formed, a second layer composed of an acrylic resin and a squarylium compound is formed on the first layer, and a third layer composed of an acrylic resin and a cyanine compound is formed on the second layer.

Now, a method of forming the resin layer 102 is described in detail. First, an acrylic resin (transparent resin) and a benzotriazole compound (ultraviolet absorbing dye) are mixed in a predetermined mixing ratio in a container to prepare a first resin film formation liquid. The prepared first resin film formation liquid is applied onto the glass substrate 101 using a spin coater to form a first layer.

Next, an acrylic resin (transparent resin) and a squarylium compound (the first near-infrared absorbing dye) are mixed in a predetermined mixing ratio in a container to prepare a second resin film formation liquid. The obtained second resin film formation liquid is applied onto the first layer using a spin coater, thereby forming a second layer.

Next, an acrylic resin (transparent resin) and a cyanine compound (the second near-infrared absorbing dye) are mixed in a predetermined mixing ratio in a container to prepare a third resin film formation liquid. The obtained third resin film formation liquid is applied onto the second layer using a spin coater, thereby forming a third layer.

Figure 5:
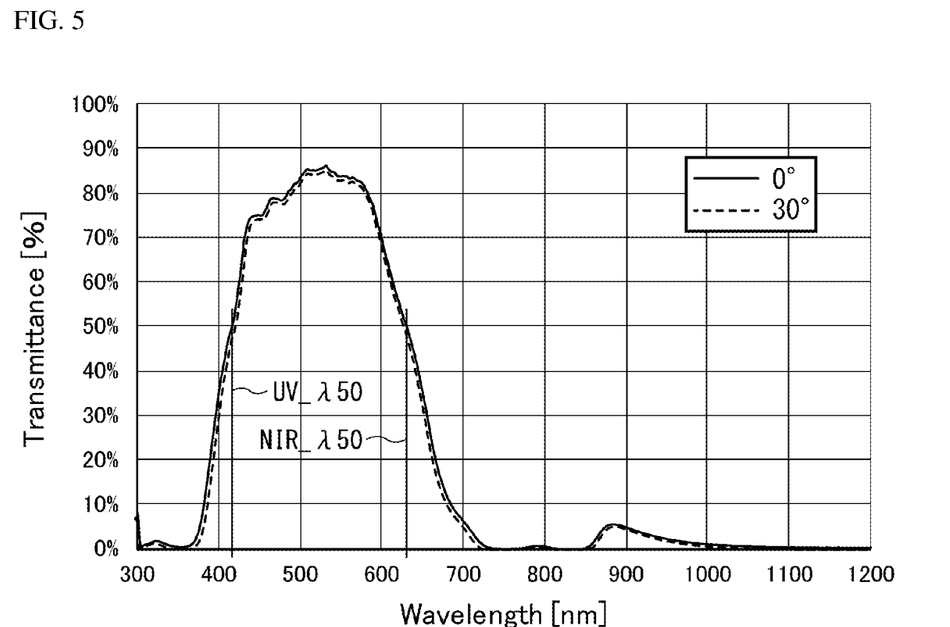
FIG. 5 illustrates a spectral transmittance curve of a near-infrared cut-off filter according to a first embodiment of the present disclosure.

FIG. 5 illustrates a spectral transmittance curve of the near-infrared cut-off filter 100 of Example 2. Particularly, FIG. 5 illustrates a spectral transmittance curve (solid line) when the angle of incidence is 0°, and a spectral transmittance curve (dashed line) when the angle of incidence is 30°. As shown in FIG. 5, in the case of the near-infrared cut-off filter 100 of the example, a half-value wavelength (UV_$\lambda$50) on a short wavelength side of the spectral transmittance curve is about 417 nm, a half-value wavelength (NIR $\lambda$50) on a long wavelength side thereof is about 631 nm, and an average transmittance in a wavelength region of 1000 to 1200 nm is 0.46%. Therefore, the near-infrared cut-off filter exhibiting properties close to human visibility was obtained.

In addition, it can be confirmed that, when compared with Example 1 (FIG. 4), a peak is suppressed near 800 to 900 nm, and hence the spectral transmittance curve is closer to human visibility.

In addition, since the near-infrared cut-off filter 100 of the example does not include a reflective film included in an existing near-infrared cut-off filter as in Example 1, the occurrence of phase shift, wavelength shift, and ripples that significantly impair the performance of a cut-off filter, may be suppressed even when the angle of incidence is 30°.

Comparative Example 1

As a glass substrate of a near-infrared cut-off filter of Comparative Example 1, fluorophosphate glass (CXA700, thickness 0.21 mm) manufactured by HOYA Corporation was selected, which differs from Examples 1 and 2. A resin layer is formed of the same components as those of the resin layer 102 of Example 1, but a ratio (contents) of the components differs from Example 1.

Figure 6:
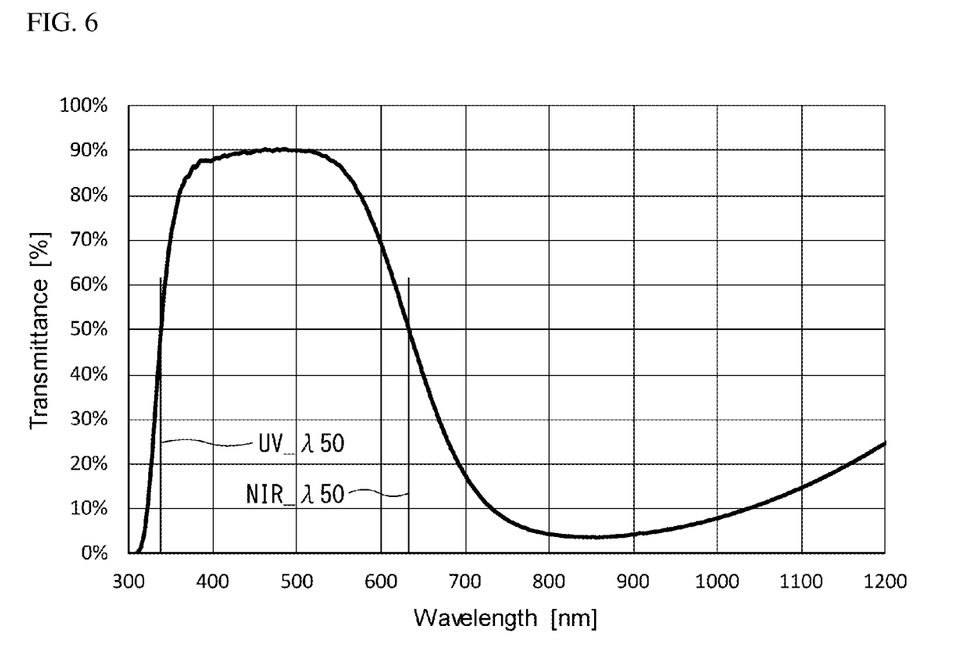
FIG. 6 illustrates a spectral transmittance curve of a glass substrate used in a near-infrared cut-off filter according to a comparative example of the present disclosure.

FIG. 6 illustrates a spectral transmittance curve of the glass substrate of Comparative Example 1. Here, the vertical axis represents transmittance (%), and the horizontal axis represents wavelength (nm).

As shown in FIG. 6, the glass substrate of this modified example exhibits an average transmittance of 15.4% (i.e., greater than 1%) in a wavelength region of 1000 to 1200 nm.

Figure 7:
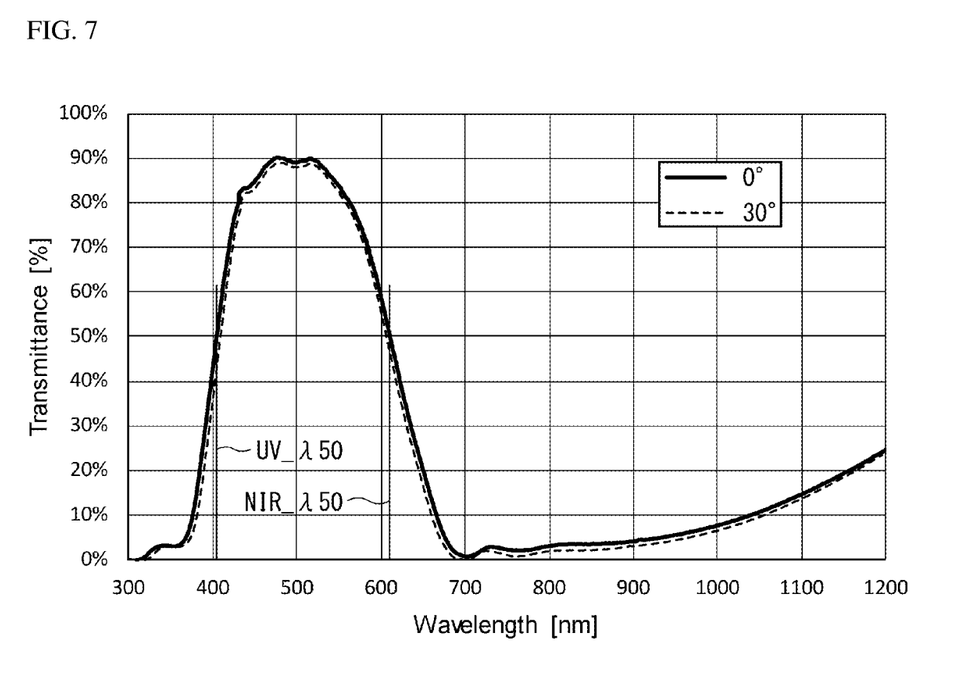
FIG. 7 illustrates a spectral transmittance curve of a near-infrared cut-off filter according to a comparative example of the present disclosure.

FIG. 7 illustrates a spectral transmittance curve of the near-infrared cut-off filter of Comparative Example 1. Particularly, FIG. 7 illustrates a spectral transmittance curve (solid line) when the angle of incidence is 0°, and a spectral transmittance curve (dashed line) when the angle of incidence is 30°.

As shown in FIG. 7, in the case of the near-infrared cut-off filter of the comparative example, a half-value wavelength (NIR_$\lambda$50) on a long wavelength side of the spectral transmittance curve is about 610 nm, and an average transmittance in a wavelength region of 1000 to 1200 nm is 15.3%. That is, when compared to the near-infrared cut-off filter 100 of Example 1, an average transmittance in a wavelength region of 1000 to 1200 nm is higher. In addition, since the near-infrared cut-off filter of the Comparative Example does not include a reflective film as in the near-infrared cut-off filters 100 of Examples 1 and 2, the occurrence of phase shift, wavelength shift, and ripples that significantly impair the performance of a cut-off filter, may be suppressed even when light is incident at an incidence angle of 30°.

As such, the near-infrared cut-off filter of Comparative Example 1 exhibits an average transmittance of 10% or more higher in a wavelength region of 1000 to 1200 nm, when compared to the near-infrared cut-off filters 100 of Examples 1 and 2, which causes poor color reproduction. To address such a problem, it is effective to use a reflective layer as in existing near-infrared cut-off filters. However, upon use of a reflective layer, phase shift may occur, which may cause occurrence of wavelength shift or ripples.

That is, in the case of the near-infrared cut-off filters 100 of the embodiment (Examples 1 and 2), a glass substrate having a very low average transmittance (i.e., 1% or less) in a wavelength region of 1000 to 1200 nm was used as the glass substrate 101, so that properties close to human visibility were obtained without use of a conventional reflective layer.

As such, since the near-infrared cut-off filter 100 of the embodiment does not include a conventional reflective layer, dependency on the angle of incidence is extremely low, so that excellent oblique incidence characteristics are exhibited. In addition, in the case of the imaging device 1 including the near-infrared cut-off filter 100, the occurrence of ghosts is suppressed, so that an image having excellent color reproduction can be obtained.

Although the present disclosure has been described through embodiments, the present disclosure is not intended to be limited to the embodiments. Those skilled in the art will appreciate that various modifications are possible, without departing from the scope and spirit of the disclosure.

For example, in the case of the near-infrared cut-off filters 100 of the embodiment (Examples 1 and 2), half-value wavelengths (UV_$\lambda$50) on short wavelength sides of the transmittance curves are respectively about 412 nm (Example 1) and about 417 nm (Example 2), and half-value wavelengths (NIR_$\lambda$50) on long wavelength sides of the transmittance curves are respectively about 633 nm (Example 1) and 631 nm (Example 2), but the properties of the near-infrared cut-off filters 100 are not limited thereto. By appropriately selecting an ultraviolet absorbing dye and a near-infrared absorbing dye for the resin layer 102, the half-value wavelength on the short wavelength side of the transmittance curve may be adjusted in a range of 385 to 420 nm, and the half-value wavelength on the long wavelength side thereof may be adjusted in a range of 600 to 680 nm.

In addition, although the single-layer resin layer 102 composed of an acrylic resin (transparent resin), a benzotriazole compound (ultraviolet absorbing dye), and a squarylium compound (the first near-infrared absorbing dye) is exemplified in Example 1, the present disclosure is not limited thereto. The functional layer 102 of Example 1 may have a multi-layered structure as in the functional layer 102 of Example 2. For example, the resin layer 102 of Example 1 may be obtained by forming a first layer, composed of an acrylic resin and a benzotriazole compound, on the glass substrate 101, and forming a second layer, composed of an acrylic resin and a squarylium compound, on the first layer. In this case, the order of the first layer and the second layer may be changed (i.e., the formation order may be changed).

In addition, the ultraviolet absorbing dye, the first near-infrared absorbing dye and the second near-infrared absorbing dye of the embodiment (Examples 1 and 2) do not necessarily have to be composed of one dye type, and may respectively contain a plurality of dye types. That is, the ultraviolet absorbing dye, the first near-infrared absorbing dye and the second near-infrared absorbing dye of the embodiment respectively include at least one type of dye.

In addition, in Example 1, although phosphate glass having a thickness of 0.9 mm was used as the glass substrate 101, the present disclosure is not limited to such a configuration. By appropriately adjusting a doping amount of Fe in glass, the glass substrate 101 having a desired thickness (e.g., 0.21 mm) may be obtained while having the same spectral transmittance characteristics.

Second Embodiment

Figure 8:
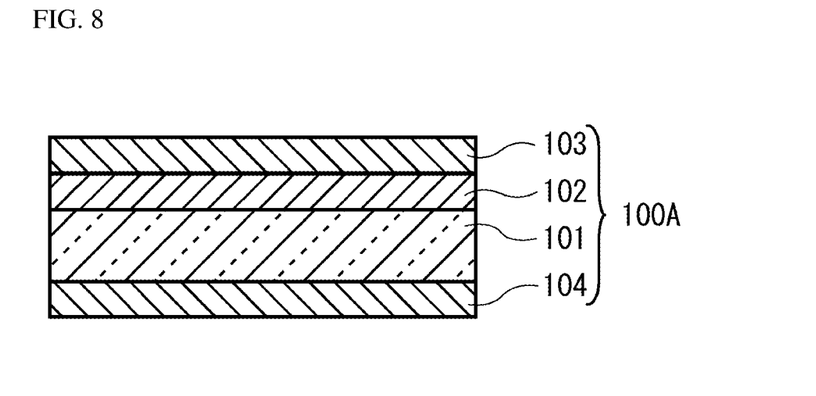
FIG. 8 is a longitudinal sectional view illustrating the configuration of a near-infrared cut-off filter according to a second embodiment of the present disclosure.

FIG. 8 is a longitudinal sectional view illustrating the configuration of a near-infrared cut-off filter 100A according to a second embodiment of the present disclosure. As shown in FIG. 8, the near-infrared cut-off filter 100A of the embodiment differs from the near-infrared cut-off filter 100 according to the first embodiment in that the near-infrared cut-off filter 100A includes an antireflection film 103 formed on a top surface of the resin layer 102 (on a surface opposite to the glass substrate 101), and an antireflection film 104 formed on another main surface (a lower surface in FIG. 8) of the glass substrate 101.

When the antireflection films 103 and 104 are formed in such a manner, reflection at interfaces (i.e., an incident surface and an emission surface) of the near-infrared cut-off filter 100A may be suppressed, thereby increasing (improving) transmittance.

The antireflection films 103 and 104 of the embodiment serve to prevent reflection at interfaces of the incident surface and the emission surface of the near-infrared cut-off filter 100A. In particular, each of the antireflection films 103 and 104 is composed of a multilayer dielectric film formed by alternately laminating a dielectric film with a low refractive index and a dielectric film with a high refractive index.

A dielectric film material constituting the multilayer dielectric film may be freely selected according to desired optical properties. A material for a dielectric layer with a low refractive index has preferably a refractive index of 1.1 to 1.5. As the material with a low refractive index, for example, a hollow $SiO_2$, $MgF_2$, or $SiO_2$ material, a low-refractivity sol-gel coat having an air-sol structure, or the like may be applied. In addition, a material for a dielectric layer with a high refractive index has preferably a refractive index of 2.0 to 2.5. As the material having a high refractive index, for example, $ZrO_2$, $Ta_2O_5$, $TiO_2$, $Nb_2O_5$, or the like may be applied.

In addition, as the material with a high refractive index, a material (e.g., $SiO_2$) having a refractive index of 1.4 to 1.6 may be used. In this case, a material (e.g., air-sol coat) with a refractive index of 1.1 to 1.3 may be used as a material with a low refractive index.

As such, due to use of a multilayer dielectric film as the antireflection films 103 and 104, an antireflection function may be easily provided by using interference of light generated from each dielectric film. However, as the number of layers increases, the length of an optical path increases at the time of oblique incidence of light, so that an interference condition of reflected light in each layer is destroyed, resulting in occurrence of wavelength shift or ripples. In addition, such wavelength shift or ripples cause increase of reflected light and are observed as a kind of ghost on the solid-state imaging device 200, whereby accurate color reproduction cannot be obtained. To address such problems, the multilayer dielectric film of the embodiment is configured such that the number of layers is 10 or less. In addition, the number of the layers is particularly 5 or less, preferably 3 or less.

In addition, the thickness of the dielectric film constituting the multilayer dielectric film may be freely selected according to desired optical properties. The thickness of the dielectric film is preferably 50 nm to 1 μm, more preferably 50 nm to 500 nm.

In addition, the entire thickness of the multilayer dielectric films (i.e., the antireflection films 103 and 104) is set to 500 nm or less.

Hereinafter, the near-infrared cut-off filter 100A of the embodiment is described in more detail with reference to examples, but the present disclosure is not limited to the examples.

Example 3

The antireflection films 103 and 104 were further formed on the near-infrared cut-off filter 100 of Example 2 according to the following order (3. Formation of antireflection films 103 and 104), thereby manufacturing the near-infrared cut-off filter 100A of Example 3.

[3. Formation of Antireflection Films 103 and 104]

Dielectric thin films of Table 1 (Dielectric layers 1 to 5) were sequentially formed on a top surface of the resin layer 102 (on a surface opposite to the glass substrate 101) of the near-infrared cut-off filter 100 of Example 2 and on another main surface (on a lower surface in FIG. 8) of the glass substrate 101, using a so-called sol-gel method (i.e., the antireflection films 103 and 104 were formed). As a result, the near-infrared cut-off filter 100A of Example 3 was obtained.

TABLE 1

| | Thickness (nm) | Refractive index | Material |
| --- | --- | --- | --- |
| Dielectric layer 5 | 85 | 1.48 | $SiO_2$ |
| Dielectric layer 4 | 107 | 2.42 | $TiO_2$ |
| Dielectric layer 3 | 35 | 1.48 | $SiO_2$ |
| Dielectric layer 2 | 11 | 2.42 | $TiO_2$ |
| Dielectric layer 1 | 98 | 1.48 | $SiO_2$ |
| Glass | | 1.52 | Phosphoric acid/fluorophosphoric acid |

Figure 9:
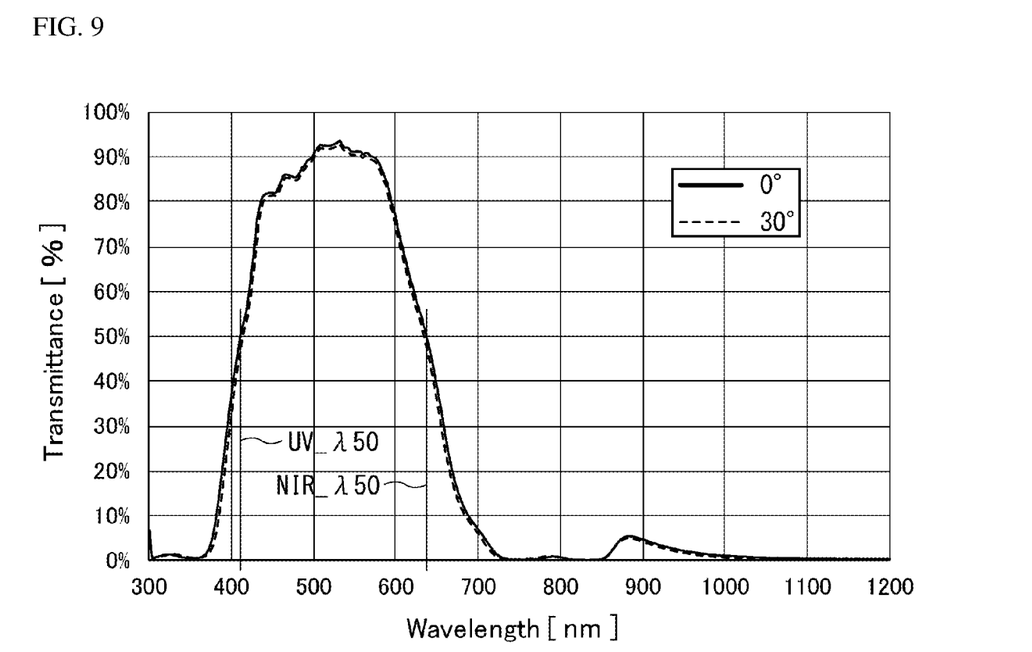
FIG. 9 illustrates a spectral transmittance curve of a near-infrared cut-off filter according to a second embodiment of the present disclosure.

FIG. 9 illustrates a spectral transmittance curve of the near-infrared cut-off filter 100A of Example 3. Particularly, FIG. 9 illustrates a spectral transmittance curve (solid line) when the angle of incidence is 0°, and a spectral transmittance curve (dashed line) when the angle of incidence is 30°. As shown in FIG. 9, in the case of the near-infrared cut-off filter 100A of the example, a half-value wavelength (UV_λ50) on a short wavelength side of the spectral transmittance curve is about 411 nm, a half-value wavelength (NIR_λ50) on a long wavelength side thereof is about 637 nm, and an average transmittance in a wavelength region of 1000 to 1200 nm is 0.38%. Therefore, the near-infrared cut-off filter exhibiting properties close to human visibility was obtained.

In addition, although the near-infrared cut-off filter 100A of the example includes multilayer dielectric films as the antireflection films 103 and 104, phase shift, wavelength shift, and ripples that significantly deteriorate the performance of a cut-off filter do not occur even when light is incident at an incidence angle of 30° because the multilayer dielectric films are sufficiently thin (500 nm or less).

In addition, since the near-infrared cut-off filter 100A of the example includes the antireflection films 103 and 104, the near-infrared cut-off filter 100A exhibits a high transmittance, compared to the near-infrared cut-off filter 100 of Example 2 (i.e., compared to FIG. 5). That is, a transmittance peak of the near-infrared cut-off filter 100A is about 94%.

As such, the near-infrared cut-off filter 100A of the embodiment has excellent oblique incidence characteristics and high transmittance. In addition, the imaging device 1 provided with the near-infrared cut-off filter 100A is bright, thereby providing an excellent image upon color reproduction.

In addition, although the resin layer 102 of the embodiment is illustrated as being formed on one main surface (on an upper surface in FIG. 8) of the glass substrate 101, the resin layer 102 may be formed on another main surface (a lower surface in FIG. 8) of the glass substrate 101, as in the first embodiment, or on both surfaces of the glass substrate 101. In addition, the resin layer 102 does not necessarily have to be one layer, and may be composed of multiple layers.

Third Embodiment

Figure 10:
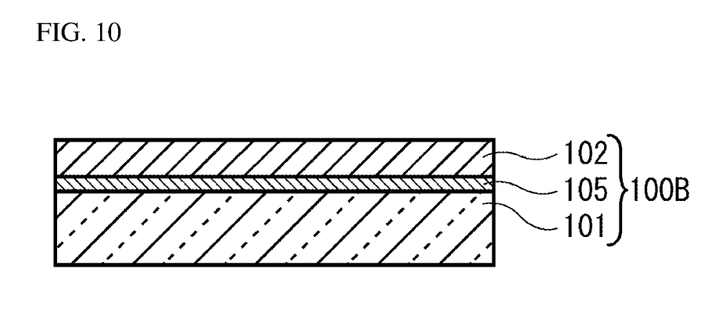
FIG. 10 is a longitudinal sectional view illustrating the configuration of a near-infrared cut-off filter according to a third embodiment of the present disclosure.

FIG. 10 is a longitudinal sectional view illustrating the configuration of a near-infrared cut-off filter 100B according to a third embodiment of the present disclosure. As shown in FIG. 10, the near-infrared cut-off filter 100B of the embodiment differs from the near-infrared cut-off filter 100 according to the first embodiment in that the near-infrared cut-off filter 100B includes a bonding layer 105 that is formed between the glass substrate 101 and the resin layer 102 for bonding of the glass substrate 101 and the resin layer 102.

When the bonding layer 105 is formed in such a manner, adhesion of the resin layer 102 to the glass substrate 101 may be increased, so that reliability may be improved.

The present inventors have intensively studied, and, as a result, have confirmed that adhesion of the resin layer 102 to the glass substrate 101 may be increased upon use of a bonding component including one or more selected from Si atom, Ti atom, Zr atom and Al atom. The bonding layer 105 of the embodiment has been used based on such a finding, and has a single-layer structure including one or more selected from Ti atom, Zr atom and Al atom, together with Si atom.

In addition, in the present specification, a single-layer structure refers to a layer structure that is confirmed as being composed of a material having the same composition by an image (image contrast) or an elemental analysis result obtained under the following conditions by means of a scanning transmission electron microscope-energy dispersive X-ray spectrometer (STEM-EDX).

<Measurement Conditions>

Scanning transmission electron microscope: ARM200F manufactured by JEOL Ltd.

Energy dispersive X-ray spectroscopy analyzer: JED-2300T manufactured by JEOL Ltd.

Sample preparation: Focused ion beam processing (FIB)

Acceleration voltage: 200 kV

Elemental Analysis: EDX mapping (resolution: 256×256)

The thickness of the bonding layer 105 is preferably 1000 nm or less, more preferably 10 to 500 nm, even more preferably 30 to 300 nm.

When the thickness of the bonding layer 105 is 1000 nm or less, irregularity occurrence upon formation (firing) of the bonding layer 105 may be easily suppressed, thereby being capable of easily uniformizing a film surface of the bonding layer 105.

In addition, when the thickness of the bonding layer 105 is 10 nm or more, it is easy to exhibit sufficient bonding strength of the bonding layer 105, thereby being capable of easily improving the mechanical strength of the near-infrared cut-off filter 100B.

In addition, in the present specification, the thickness of the bonding layer 105 refers to an arithmetic mean value of the thicknesses of 50 points of the bonding layer 105 with regard to a measured image (image contrast) of a cross section of the near-infrared cut-off filter 100B obtained by means of STEM-EDX.

The bonding layer 105 of the embodiment includes one or more selected from Ti atom, Zr atom and Al atom together with Si atom. Among one or more selected from Ti atom, Zr atom and Al atom contained together with Si atom in the bonding layer 105, Ti atom is preferred.

In the bonding layer 105 of the embodiment, a ratio α (atomic %) of the total number (the total number of atoms) of Ti atom, Zr atom and Al atom to the total number (the total number of atoms) of Si atom, Ti atom, Zr atom and Al atom is preferably greater than 0 atomic % and 33.3 atomic % or less, more preferably 9 to 33.3 atomic %, even more preferably 12 to 33.3 atomic %. In addition, in the present specification, a ratio α (atomic %) of the total number (the total number of atoms) of Ti atom, Zr atom and Al atom to the total number (the total number of atoms) of Si atom, Ti atom, Zr atom and Al atom constituting the bonding layer 105 is calculated according to the following method.

(1) The optical filter was subjected to STEM-EDX measurement under the above measurement conditions to obtain a STEM-EDX line (EDX rays (K rays) detection intensity line, in a depth direction, of each element constituting the optical filter).

(2) In a region constituting the bonding layer 105, the accumulated strength, $X_{Si}$, of EDX rays of Si atom, the accumulated strength, $X_{Ti}$, of EDX rays of Ti atom, the accumulated strength, $X_{Zr}$, of EDX rays of Zr atom, and the accumulated strength, $X_{Al}$, of EDX rays of Al atom were respectively found.

(3) A value obtained by multiplying each accumulated EDX ray strength obtained according to (2) by k factor (a correction factor different for each atomic number, depending upon acceleration voltage or detection efficiency. Hereinafter, for convenience, the k factor of Si atom is denoted by $K_{Si}$, the k factor of Ti atom is denoted by $K_{Ti}$, the k factor of Zr atom is denoted by $K_{Zr}$, and the k factor of Al atom is denoted by $K_{Al}$) may be considered as corresponding to a weight ratio of each constituent element. Accordingly, for example, a relative weight, $A_{Ti}$ (% by weight), of Ti atom constituting the bonding layer may be calculated according to the following equation.

$$A_{Ti} = \frac{(X_{Ti} \times K_{Ti})}{(X_{Si} \times K_{Si}) + (X_{Ti} \times K_{Ti}) + (X_{Zr} \times K_{Zr}) + (X_{Al} \times K_{Al})} \times 100 \quad \text{[Equation 1]}$$

In addition, a value obtained by dividing a value, which is obtained by multiplying the accumulated strength, X, of EDX rays of each of the elements by k factor, by each atomic weight, M, may be considered as corresponding to a ratio of the number of atoms of each constituent element. Accordingly, when the atomic weight of Si atom is denoted by $M_{Si}$, the atomic weight of Ti atom is denoted by $M_{Ti}$, the atomic weight of Zr atom is denoted by $M_{Zr}$, and the atomic weight of Al atom is denoted by $M_{Al}$, for example, a ratio, $\alpha_{Ti}$ (atomic %), of the number of atoms of Ti atom constituting the bonding layer 105 may be calculated according to the following equation.

$$\alpha_{Ti} = \frac{(X_{Ti} \times K_{Ti} \div M_{Ti})}{(X_{Si} \times K_{Si} \div M_{Si}) + (X_{Ti} \times K_{Ti} \div M_{Ti}) + (X_{Zr} \times K_{Zr} \div M_{Zr}) + (X_{Al} \times K_{Al} \div M_{Al})} \times 100 \quad \text{[Equation 2]}$$

In addition, a ratio α (atomic %) of the total number of atoms of Ti atom, Zr atom and Al atom constituting the bonding layer 105 may be calculated according to the following equation.

$$\alpha = \frac{(X_{Ti} \times K_{Ti} \div M_{Ti}) + (X_{Zr} \times K_{Zr} \div M_{Zr}) + (X_{Al} \times A_{Al} \div M_{Al})}{(X_{Si} \times K_{Si} \div M_{Si}) + (X_{Ti} \times K_{Ti} \div M_{Ti}) + (X_{Zr} \times K_{Zr} \div M_{Zr}) + (X_{Al} \times K_{Al} \div M_{Al})} \times 100 \quad \text{[Equation 3]}$$

For example, when the bonding layer 105 includes Si atom and Ti atom, but excludes Zr atom and Al atom, a ratio α (atomic %) of the total number of atoms of Ti atom, Zr atom and Al atom constituting the bonding layer 105 may be calculated according to the following equation.

$$\alpha = \frac{(X_{Ti} \times K_{Ti} + M_{Ti})}{(X_{Si} \times K_{Si} + M_{Si}) + (X_{Ti} \times K_{Ti} + M_{Ti})} \times 100 \quad \text{[Equation 4]}$$

In addition, in the embodiment, $K_{Si}=1.000$, $K_{Ti}=1.033$, $K_{Zr}=5.696$, and $K_{Al}=1.050$.

Hereinafter, the near-infrared cut-off filter 100B of the embodiment is described in more detail with reference to examples, but the present disclosure is not limited to the examples.

Example 4

On the glass substrate 101 of Example 1, the bonding layer 105 was formed according to the following procedure (4. Formation of bonding layer 105). In addition, the resin layer 102 was formed on a top surface of the bonding layer 105 according to the same procedure (2. Formation of resin layer 102) as in Example 1. As a result, the near-infrared cut-off filter 100B was manufactured.

[4. Formation of Bonding Layer 105]

1. Preparation of Coupling Agent-Containing Coating Liquid (1) 0.3 mL of 0.5 N (mol/L) HCl aqueous solution and 2.2 mL of 2-methoxyethanol were weighed and mixed in a container under sealed conditions.

(2) Tetraethyl orthosilicate $(Si(OC_2H_5)_4)$ was added to the container and mixed under sealed conditions for 30 minutes to cause a reaction represented by the following reaction formula.

$Si(OC_2H_5)_4 + H_2O \rightarrow HO-Si(OC_2H_5)_3 + C_2H_5OH$

Since all water is consumed by the above reaction to cause generation of a hydroxyl group, hydroxide does not precipitate even if an alkoxide of Ti having a high hydrolysis rate is added. Accordingly, a solution was expected to become homogeneous.

(3) Titanium $(IV)_n$-butoxide $(Ti(OC_4H_9)_4)$ was added to a predetermined ratio (e.g., 3 to 20 mol %) into the container and mixed for 30 minutes under sealed conditions. As a result, a coupling agent-containing coating liquid was prepared.

At this time, it was considered that a reaction represented by the following reaction formula occurred in the container.

$4OH-Si(OC_2H_5)_3 + Ti(OC_4H_9)_4 \rightarrow Ti(O-Si(OC_2H_5)_3)_4 + 4C_4H_9OH$ 2. Formation of Coating Film In the container containing the coupling agent-containing coating liquid, 1.2 mL of 0.5 N HCl aqueous solution, 4.7 mL of water, and 8.1 mL of 2-methoxyethanol were weighed and mixed for 30 minutes under sealed conditions. As a result, a coating film formation liquid was prepared.

At this time, it was considered that a reaction represented by the following reaction formula occurred in the container.

$Ti\{(O-Si(OC_2H_5)_3\}_4 + 12H_2O \rightarrow Ti\{(O-Si(OH)_3\}_4 + 12C_2H_5OH$ $HO-Si(OC_2H_5)_3 + 3H_2O \rightarrow Si(OH)_4 + 3C_2H_5OH$ The obtained coating film formation liquid was applied to a thickness of 0.03 mL/cm² onto the glass substrate 101 using a spin coater.

The glass substrate 101 coated with the coating film formation liquid was placed on a hot plate heated to 250° C., followed by heating for 30 minutes for dehydration and condensation. As a result, a curing film (the bonding layer 105) was formed on a surface of the glass substrate 101.

Next, the resin layer 102 was formed on a top surface of the bonding layer 10 using the same procedure (2. Formation of resin layer 102) as in Example 1, thereby manufacturing the near-infrared cut-off filter 100B.

As such, when the bonding layer 105 is formed between the glass substrate 101 and the resin layer 102, adhesion of the resin layer 102 to the glass substrate 101 may be greatly increased. Accordingly, reliability may be greatly improved.

In addition, although the bonding layer 105 of the embodiment includes one or more selected from Ti atom, Zr atom and Al atom, together with Si atom, respective components of the bonding layer 105 may be included in the resin layer 102 instead of formation of the bonding layer 105. That is, the resin layer 102 may be configured to include one or more selected from Ti atom, Zr atom and Al atom, together with Si atom.

In addition, although the bonding layer 105 of the embodiment includes one or more selected from Ti atom, Zr atom and Al atom, together with Si atom, any method of increasing adhesion of the resin layer 102 to the glass substrate 101 may be used. For example, a transparent deposition-type or coating-type adhesive may be applied.

In addition, although the resin layer 102 of the embodiment is formed on one main surface (an upper surface in FIG. 10) of the glass substrate 101 through the bonding layer 105, the resin layer 102 may be formed on another main surface (a lower surface in FIG. 10) of the glass substrate 101 through the bonding layer 105 as in the first embodiment, or on both surfaces of the glass substrate 101. In addition, the resin layer 102 does not necessarily have to be one layer, and may be composed of multiple layers.

As apparent from the above description, the present disclosure provides a near-infrared cut-off filter that has excellent oblique incidence characteristics due to extremely low dependency on the angle of incidence and a low transmittance in a wavelength region of 1000 nm or more. In addition, an imaging device having excellent color reproduction due to inclusion of the near-infrared cut-off filter is provided.

While the embodiments of the present disclosure have been described, it should be understood that there is no intent to limit the disclosure to the embodiments disclosed, rather, the disclosure is to cover all modifications falling within the spirit and scope of the disclosure as defined by the claims.

DESCRIPTION OF SYMBOLS

1: imaging device
11: absorption layer
12: reflective layer
13: transparent substrate
100: near-infrared cut-off filter
100A: near-infrared cut-off filter
100B: near-infrared cut-off filter
101: glass substrate
102: resin layer
103: antireflection film
104: antireflection film
105: bonding layer
200: solid-state imaging device
300: package

What is claimed is:

1. A near-infrared cut-off filter, comprising:
a transparent substrate that is formed of glass containing iron atoms and has a half-value wavelength of greater than 630 nm on a long wavelength side of a transmittance curve and an average transmittance of 1% or less in a wavelength region of 1000 to 1200 nm; and
a resin layer formed on at least one main surface of the transparent substrate to absorb light of a specific wavelength;
wherein said transparent substrate does not include a multi-layer dielectric film.

2. The near-infrared cut-off filter according to claim 1, wherein a half-value wavelength on a short wavelength side of a transmittance curve of the transparent substrate is 300 to 420 nm, and a half-value wavelength on a long wavelength side thereof is 630 to 750 nm.

3. The near-infrared cut-off filter according to claim 1, wherein the resin layer comprises a transparent resin; and a dye uniformly dispersed in the transparent resin.

4. The near-infrared cut-off filter according to claim 3, wherein the dye comprises an ultraviolet absorbing dye having a maximum absorption wavelength of 350 to 400 nm; and a first near-infrared absorbing dye having a maximum absorption wavelength of 650 to 750 nm.

5. The near-infrared cut-off filter according to claim 4, wherein the dye further comprises a second near-infrared absorbing dye having a maximum absorption wavelength of 750 to 950 nm.

6. The near-infrared cut-off filter according to claim 1, wherein the resin layer comprises one or more selected from Ti atom, Zr atom and Al atom, together with Si atom.

7. The near-infrared cut-off filter according to claim 1, wherein a bonding layer is provided between the transparent substrate and the resin layer so as to improve adhesion of the resin layer to the transparent substrate.

8. The near-infrared cut-off filter according to claim 7, wherein the bonding layer has a single-layer structure comprising one or more selected from Ti atom, Zr atom and Al atom, together with Si atom.

9. The near-infrared cut-off filter according to claim 8, wherein, in the bonding layer, a ratio of the total number of atoms of Ti atom, Zr atom and Al atom to the total number of atoms of Si atom, Ti atom, Zr atom and Al atom is greater than 0 atomic % and 33.3 atomic % or less.

10. The near-infrared cut-off filter according to claim 1, wherein a first antireflection film is formed on the resin layer, and a second antireflection film is formed on another main surface of the transparent substrate.

11. The near-infrared cut-off filter according to claim 10, wherein the near-infrared cut-off filter has a half-value wavelength of 385 to 420 nm on a short wavelength side of a transmittance curve, and a half-value wavelength of 600 to 680 nm on a long wavelength side thereof.

12. The near-infrared cut-off filter according to claim 10, wherein each of the first and second antireflection films is formed of a multilayer dielectric film having a thickness of 500 nm or less.

13. The near-infrared cut-off filter according to claim 12, wherein the number of layers constituting the multilayer dielectric film is 10 or less.

14. The near-infrared cut-off filter according to claim 12, wherein the multilayer dielectric film is formed by alternately laminating a low-refractive-index dielectric film formed of a material having a refractive index of 1.1 to 1.5, and a high-refractive-index dielectric film formed of a material having a refractive index of 2.0 to 2.5.

15. The near-infrared cut-off filter according to claim 12, wherein the multilayer dielectric film is formed by alternately laminating a low-refractive-index dielectric film formed of a material having a refractive index of 1.1 to 1.3, and a high-refractive-index dielectric film formed of a material having a refractive index of 1.4 to 1.6.

16. The near-infrared cut-off filter according to claim 1, wherein the transparent substrate has a thickness of 0.01 to 1.5 mm.

17. An imaging device, comprising a solid-state imaging device;
and the near-infrared cut-off filter according to claim 1.

18. The imaging device according to claim 17, wherein the near-infrared cut-off filter is disposed immediately in the front of the solid-state imaging device to function as a cover glass.

* * * * *